United States Patent [19]
Brennan

[11] 3,883,527
[45] May 13, 1975

[54] PROCESS FOR PREPARATION OF 2-ARYL-1,3,4-TRIAZINE-3,5(2H,4H)-DIONES

[75] Inventor: Thomas M. Brennan, Niantic, Conn.

[73] Assignee: Pfizer Inc., New York, N.Y.

[22] Filed: Oct. 19, 1973

[21] Appl. No.: 407,872

[52] U.S. Cl......... 260/248 AS; 424/249; 260/243 B; 260/247.1; 260/247.5 R; 260/239.7; 260/153; 260/465 D; 260/558 H
[51] Int. Cl............................................. C07d 55/10
[58] Field of Search........ 260/248 AS, 239.7, 247.1, 260/243 B, 247.5 R

[56] References Cited
UNITED STATES PATENTS
3,560,496  2/1971  Howes et al. .................. 260/248

Primary Examiner—John M. Ford
Attorney, Agent, or Firm—Connolly and Hutz

[57] ABSTRACT

A process for making 2-aryl-1,2,4-triazine-3,5(2H,4H)-diones which comprises (a) coupling a diazotized arylamine with a lower alkyl cyanoacetate: (b) hydrolyzing and decarboxylating the lower alkyl cyanoglyoxalate arylhydrazone thus produced under alkaline conditions; and (c) cyclizing the resulting glyoxamide arylhydrazone by reaction with a dialkyl carbonate, an alkyl chloroformate or phosgene in the presence of a condensing agent to the corresponding 2-aryl-1,2,4-triazine-3,5(2H,4H)-dione. The products are useful as coccidiostats.

23 Claims, No Drawings

PROCESS FOR PREPARATION OF 2-ARYL-1,3,4-TRIAZINE-3,5(2H,4H)-DIONES

BACKGROUND OF THE INVENTION

The preparation of 2-aryl-1,2,4-triazine-3,5(2H,4H)-diones by decomposition of the corresponding 6-carboxy acid derivatives has been reported by Slouka, Monats, Chem. 96, 134–137 (1965). An improved method of decarboxylation which permits use of lower temperatures than those required by Slouka's method, comprises contacting the 6-carboxy acid derivatives with a mercaptohydrocarbon carboxylic acid or lower alkyl ester thereof (Belgian Pat. No. 78,554, granted Dec. 29, 1973). The requisite 6-carboxy acid derivatives are obtained by acid hydrolysis of the corresponding cyano compounds which are, in turn, prepared according to the procedure of Slouka, Monatsh, Chem. 94,258–262 (1963). The procedure comprises reaction of the appropriate phenyl diazonium salt with cyanoacetylurethan to provide the corresponding phenylhydrazonocyanoacetylurethan which, under the influence of alkali or sodium acetate-acetic acid or ammonium acetate-acetic acid, produces the 6-cyano compound which is hydrolyzed to the carboxy acid under acid or alkaline conditions.

Belgian Pat. No. 773,583, granted Apr. 7, 1972, describes the preparation of a large number and variety of 2-aryl-1,2,4-triazine -3,5 (2H,4H) diones by the above mentioned procedures. The condensation of certain benzenediazonium salts with malonyl diurethane in the presence of acetic acid to produce a mesoxalydiurethane phenylhydrazone, and subsequent cyclization of the hydrazone by means of potassium hydroxide to 2-phenyl-6-(N-carbethoxy) carboxamido-1,2,4-triazine-3,5(2H,4H)-dione is described by Whitely and Yapp, J. Chem. Soc. 521–528 (1927).

The coupling of ethyl cyanoacetate with benzenediazonium chloride is reported in U.S. Pat. No. 2,449,388. Parmerter, in Volume 10 of Organic Reactions at page 16 (John Wiley and Sons. Inc. N.Y., 1959), reports this coupling reactions provides a nearly quantitative yield of ethyl cyanoglyoxalate phenylhydrazone. The hydrolysis and decarboxylation of ethyl cyanoglyoxalate phenylhydrazone and analogous compounds to glyoxamide arylhydrazones is exemplified in U.S. Pat. No. 2,449,388.

The cyclization of glyoxamide arylhydrazones has not previously been reported.

SUMMARY OF THE INVENTION

It has now been found that 2-aryl-1,2,4-triazine-3,5(2H,4H)-diones can be prepared in good yield and high purity by an improved process which can be carried out step-wise or as a batch operation and which comprises: (a) coupling a diazotized aniline with a lower alkyl cyanoacetate to produce a lower alkyl cyanoglyoxalate arylhydrazone; (b) hydrolyzing and decarboxylating the thus produced hydrazone under alkaline conditions; and (c) cyclizing the resulting glyoxamide arylhydrazone by reacting it with a reagent with contributes a carbonyl group such as lower alkyl carbonates, lower alkyl chloroformates and phosgene. The reaction sequence is illustrated below

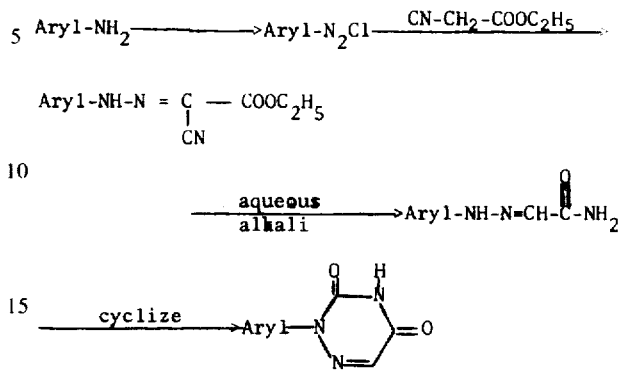

Previous methods for the production of 2-aryl-1,2,4 triazine-3,5(2H,4H)diones have necessitated the use of elevated temperatures to achieve decarboxylation of the percursor 6-carboxy acid derivatives or the use of a mercaptohydrocarbon carboxylic acid or lower alkyl ester thereof to effect decarboxylation. The former method requires rather drastic conditions and the latter the use of noxious materials which give rise to ecological problems and thus require special handling. The base catalyzed decarboxylation of the lower alkyl cyanoglyoxalate arylhydrazone is accomplished prior to cyclization under relatively mild conditions with elimination of a separate decarboxylation step as is required by the prior art methods. Additionally, the use of basic conditions for the hydrolysis step enables the present process to be used for preparation of a wider variety of 2-substituted aryl -1,2,4 triazine -3,5 (2H,4H)-diones than is possible when using acid hydrolysis.

For example, the use of acid hydrolysis excludes the presence of benzyloxy substituents from the aryl ring whereas base hydrolysis has no effect at all upon such a group when present in the aryl ring.

The surprising and unexpected feature of the hydrolysis is the production of syn-glyoxamide arylhydrazones rather than the thermodynamically favored anti-isomer. The anti-isomer is incapable of cyclizing and under normal conditions is not in equilibrium with the syn-hydrazone. The configuration of the hydrazones is not disclosed in U.S. Pat. No. 2,449,388.

DETAILED DESCRIPTION OF THE INVENTION

Step 1 of the process, diazotization of the appropriate substituted arylamine or substituted aniline, is carried out according to standard procedures. As is well known to those skilled in the art, the usual diazotization procedure comprises treating an aqueous solution of the aniline reactant at from about 0° to 10°C. with concentrated hydrochloric acid and sodium nitrite. Acetic acid is added if necessary to solubilize the aniline reactant. The diazonium salt reaction mixture is used directly in the next step of the process.

The aniline reactant and nitrite are used in equimolar quantities. At least 2.5 and, preferably, 3 equivalents of acid are used per mole of aniline reactant. Although the diazotization reaction is generally carried out using hydrochloric acid, sulfuric acid can also be used.

Care is normally taken to avoid an excess of nitrous acid in the diazonium salt reaction mixture since the excess nitrous acid will react with the cyanoacetate, requiring the use of a greater than stoichiometric amount of cyanoacetate in order to obtain maximum yield of product in Step 2.

In the event that excess (>5%) nitrous acid is present in the diazonium salt reaction mixture, the excess is destroyed by addition of urea to the mixture. However, since the diazotization reaction is generally monitored by frequent testing with starch-potassium iodide paper, the presence of a sufficient excess of nitrous acid to interfere with Step 2 of the process is unlikely.

The nature of the diazonium anion, that is, the type of anion associated with the diazonium anion, is not critical to the process. The anion can be chloride, bromide, acetate, sulfate and others. The chloride anion, that is, diazonium chloride, is preferred since it is most easily and economically obtained.

The diazonium salts are generally not isolated from the reaction mixture. Their isolation for use in Step 2 of the process is not necessary since the reaction mixture can be used directly with satisfactory results in the condensation step with the lower alkyl cyanoacetate. Additionally, diazonium salts are rather unstable when isolated and their isolation would necessitate special handling procedures.

Step 2 of the process, coupling of the aryldiazonium salt with a lower alkyl cyanoacetate is readily accomplished by reacting the aryl diazonium salt reaction mixture with the appropriate lower alkyl cyanoacetate in the presence of a basic condensing agent in a suitable solvent system. It is immaterial to the course of the reaction whether aryl diazonium salt mixture is added to the lower alkyl cyanoacetate-base condensing agent or vice versa. The diazotization reaction is, of course, conducted in an aqueous solution. In most instances the diazonium salts described herein are of low solubility in the aqueous reaction mixture and precipitate from the mixture. The reaction of the diazonium salt mixture with the lower alkyl cyanoacetate-base condensing agent is, therefore, normally conducted in a water miscible solvent which will dissolve the lower alkyl cyanoacetate-base condensing agent and the diazonium salt. Suitable solvents are the lower alkanols, mixtures of lower alkanols and lower alkanoic acids. Ethanol and ethanol-acetic acid are the solvents of choice. The terms "lower alkyl," "lower alkanol" and "lower alkanoic" as used above are intended to include alkyl groups, alkanols and alkanoic acids having from 1 to 6 carbon atoms inclusive.

The basic condensing agent can be any of a variety of bases such as, for example, sodium or potassium acetate, propionate, hydroxide, carbonate, hydride, amides or alkoxides derived from lower alkanols.

The molar ratio of basic condensing agent to lower alkyl cyanoacetate is not critical but can vary over a wide range. Ratios of from about 0.5 to about 5.0 moles of basic condensing agent per mole of lower alkyl cyanoacetate are satisfactory. The favored ratio is from about 1.0 to about 3.0 moles of basic condensing agent per mole of cyanoacetate.

The molar ratio of diazonium salt to lower alkyl cyanoacetate is also not critical but can vary over a wide range. From a practical and economical standpoint molar ratios ranging from about equimolar ratios to about 50% excess of lower alkyl cyanoacetate are useful. The temperature of the condensation is not critical. Temperatures of from about 10°C. to about 30°C. afford good overall yields of lower alkyl cyanoglyoxalate arylhydrazone.

The products of Step 2 usually precipitate from the reaction mixture and are recovered by filtration or centrifugation. In cases where the product does not spontaneously precipitate from the reaction mixture, dilution of the mixture with water generally serves to precipitate the product. The products are washed free of inorganic salts with water and used directly in the next step without further purification. It is not necessary to recover the product of this step for use in the hydrolysis and decarboxylation step. The overall process lends itself to step-wise or batch operation and can, if desired, be carried out as a "one-pot process."

The third step of the reaction, hydrolysis and decarboxylation of the lower alkyl cyanoglyoxalate arylhydrazone under alkaline conditions, is conveniently accomplished by contacting the lower alkyl cyanoglyoxalate arylhydrazone with an appropriate base in a suitable solvent. Appropriate bases are sodium, potassium and calcium hydroxides. Suitable solvents are mixtures of water and water miscible lower alkanols and especially mixtures of water and ethanol. An excess of base, generally from about 1.1 to about 10 times the required amount, is used. Excesses of from about 1.5 to about 3 times the required amount are favored.

When the reaction is conducted as a "one-pot" process, the base is added directly to the reaction mixture of Step 2 either in solid form or in solution.

The cyclization step is accomplished by reacting the glyoxamide arylhydrazone with a di(alkyl)carbonate, preferably, because of their availability, with a di(lower alkyl)carbonate in a suitable solvent medium in the presence of a strong base. Suitable solvents are benzene, xylene, toluene or excess of the di(lower alkyl)-carbonate. A variety of bases can be used such as; for example, sodium hydride, sodium lower alkoxides, sodium, triphenylmethyl sodium, sodium amide and corresponding potassium compounds. The base is used in a molar ratio of from about 1.0 to about 5.0 moles per mole of glyoxamide arylhydrazone and desirably at a level of from about 1.5 to about 3.0 moles per mole of hydrazone.

The amount of di(lower alkyl)carbonate used is not critical but can vary from about one mole per mole of hydrazone reactant to larger excesses as when it is used as both reactant and solvent. Since the glyoxamide hydrazone is the more valuable reactant it is advantageous to use at least a ten percent excess of the required amount of di(lower alkyl)carbonate to ensure maximum conversion of the hydrazone.

When phosgene or a lower alkyl chloroformate is used as source of the carbonyl component, one mole of base is used for each mole of hydrogen halide generated by reaction of the phosgene or lower alkyl chloroformate. The base can, of course, be the same or different from that used to achieve cyclization.

The term "aryl" as used herein includes a substituted phenyl moiety of the formula:

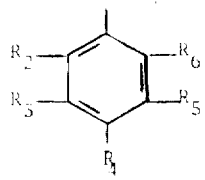

wherein each of $R_2$ and $R_6$ is hydrogen, fluoro, chloro, cyano or methyl, with the proviso that at least one of $R_2$ and $R_6$ is hydrogen or fluoro;

each of $R_3$ and $R_5$ is selected from a first sub-group consisting of hydrogen, cyano, trifluoromethyl, halogen or lower alkyl; a second sub-group consisting of lower alkoxy or lower alkylthio; a third sub-group consisting of nitro or thiocyanato;

$R_4$ is $R_3$ or a fourth sub-group consisting of $NR_7R_8$, alkylsulfonyl, $SO_2NRR_1$, lower alkanoyl, $-CH_2-NR_{11}R_{12}$,

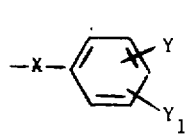 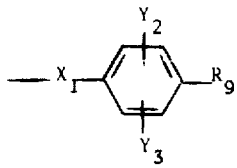

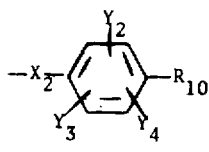 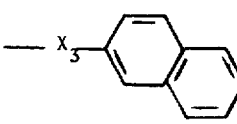

with the provisos that when $R_4$ is $SO_2NRR_1$ or alkanoyl, at least one of $R_3$ and $R_5$ is other than hydrogen, and when at least one of $R_3$ and $R_5$ is selected from the second sub-group, $R_4$ is selected from the first, third or fourth sub-groups; and when $R_3$ or $R_5$ is methyl or chloro and X is sulfur, $-SO_2-$ or

then $R_4$ is other than

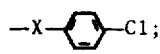

R is methyl, ethyl, allyl, propargyl, phenyl, benzyl or p-chlorophenyl;

$R_1$ is methyl, ethyl, allyl, or propargyl;

R and $R_1$ when taken together with the nitrogen to which they are attached are morpholino, thiomorpholino, pyrrolo, pyrrolino, pyrrolidino, N-(lower alkyl) piperazino, hexamethyleneimino, 3,4-dichloropiperidino, thiazolidino, $\Delta^3$-tetrahydropyridino or piperazino;

Each of $R_7$ and $R_8$ is lower alkyl of from 1 to 4 carbon atoms; $R_7$ and $R_8$ when taken together with the nitrogen atom to which they are attached are morpholino, thiomorpholino, pyrrolo, pyrrolino, pyrrolidino, piperidino, N-(lower alkyl)piperazino, hexamethyleneimino, thiazolidino, $\Delta^3$-tetrahydropyridino or piperazino;

$R_9$ is hydrogen, halogen, lower alkylthio, lower alkylsulfonyl, lower alkylsulfonyl, lower alkoxy, trifluoromethyl, or nitro;

$R_{10}$ is lower alkylthio, lower alkylsulfonyl, lower alkylsulfonyl, trifluoromethyl, lower alkanoyl or $SO_2NR'R'_1$, wherein R' is hydrogen, lower alkyl, allyl, propargyl, phenyl, benzyl, p-chlorophenyl, $\beta$-hydroxyethyl, $\beta$-acetoxyethyl, $\beta$-methoxyethyl, $\beta$-methylthioethyl, $\beta$-methylsulfonylethyl, or cyclopropyl;

$R'_1$ is hydrogen, lower alkyl, allyl, propargyl, $\beta$-hydroxyethyl, $\beta$-acetoxyethyl, $\beta$-methoxyethyl, $\beta$-methylthioethyl, $\beta$-methylsulfonylethyl, $\gamma$-($\beta$-methoxy-ethoxy)-propyl, cyclopropyl, or cyclopentyl;

and wherein R' and R'$_1$ when taken together with the nitrogen to which they are attached complete a morpholino or pyrrolidino ring; and $R_{11}$ and $R_{12}$ taken together with the nitrogen to which they are attached complete a morpholino, thiomorpholino, or thiazolidino ring;

X is selected from the group consisting of oxygen, sulfur,

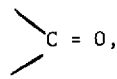

$=NH$, $-SO-$, $-SO_2-$ and $-CHOH-$;

$X_1$ is $-OCH_2-$, $-SCH_2-$, $-SOCH_2-$, $-SO_2CH_2-$, or $-CH_2-$, $-OCH_2-CO-$, $-NCH_2-$;

$X_2$ is oxygen, sulfur, $-SO-$, $$-SO_2-\overset{\diagdown}{\underset{\diagup}{C}}=O,$$

or $-CHOH-$;

$X_3$ is oxygen, sulfur, or $-OCH_2-$;

each of Y and $Y_1$ is selected from the group consisting of hydrogen, nitro, cyano, halogen, lower alkyl and lower alkoxy;

$Y_2$, $Y_3$ and $Y_4$ are each hydrogen, halogen, lower alkyl, or trifluoromethyl, and Z is hydrogen, lower alkylthio, or halogen.

The terms "lower alkyl", "lower alkanoyl" and "lower alkoxy" — as used herein — are intended to include alkyl, alkanoyl and alkoxy groups having from 1 to 6 carbon atoms.

The necessary reactants, that is, the appropriately substituted anilines of the formula

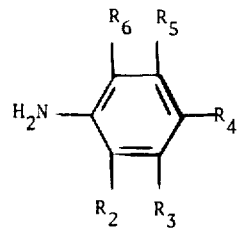

if not commercially available, are accessible by methods known to those skilled in the art. The preparation of a number of such anilines is described in Belgian Pat. 773,583, granted Apr. 7, 1972.

A number of alternative routes to the final as-triazine compounds are frequently at one's disposal. To illustrate, final compounds wherein $R_4$ is

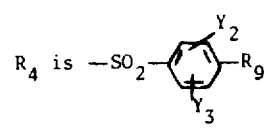

(the other R variables having the values given above) can be prepared by the procedure described and claimed herein from the appropriate arylamine wherein

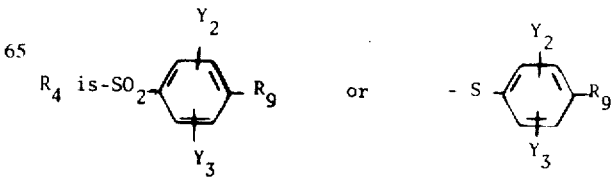

Use of the reactant having the former value of $R_4$ produces the desired compound. The latter reactant produces a thio-derivative which is subsequently oxidized to the desired sulfonyl analog according to known methods; e.g., via hydrogen peroxide.

Those final compounds wherein $R_4$ is

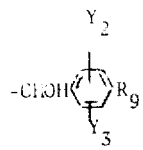

are prepared by reduction of the corresponding ketone derivatives

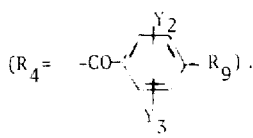

Sodium borohydride is an efficient reducing agent for the reduction of such ketones wherein at least one of $R_3$ or $R_5$ is hydrogen. Ketone precursors in which each of $R_3$ and $R_5$ is other than hydrogen are reduced in similar fashion but using excess, three to four times, sodium borohydride and elevated temperatures, i.e., reflux.

The 2-aryl-1,2,4-triazine-3,5(2H,4H)-diones described herein are highly effective in controlling coccidiosis when orally administered in small doses to poultry, in the manner described in Belgian Pat. No. 773,583. The terms "control" and "controlling" —as used herein — are intended to include the treatment, that is, the alleviation of symptoms of established coccidial infections of poultry, as well as the prevention (prophylaxis) of infection. However, because of the rapid clinical course of coccidial infections, the principal interest in these compounds resides in their use for the prevention of such infections. The compounds are generally administered orally to poultry in admixture with a nutritionally-balanced poultry feed. Feed compositions containing as little as 0.0015 percent of the agent are found to effectively combat coccidiosis. Larger amounts of the agent, up to 0.1 percent and larger, may also be employed. Of course, concentrations of less than 0.0015 percent provide some control of the infections. The concentration range favored in feed compositions is from about 0.0015 percent to about 0.05 percent. The preferred range is from about 0.0015 percent to about 0.025 percent of the ration. When administered by incorporation into the drinking water, preferably as an alkali metal or alkaline earth metal salt, the compounds are used at levels one-half the dosage given above for feeds.

EXAMPLE I

2-[3-chloro-4-(4-Chlorophenoxy)-5-Methylphenyl]-1,2,4-Triazine-3,5(2H,4H)-Dione

A. 3-Chloro-4-(4-Chlorophenoxy)-5-Methylphenyl Diazonium Chloride

A mixture of 3-chloro-4-(4-chlorophenoxy)-5-methylaniline (10g., 37 mM), water (30 ml.) and concentrated hydrochloric acid (7.5 ml.) is stirred at room temperature for one-half hour and then cooled to 10°C. A solution of sodium nitrite (2.9 g., 42 mM) in water (30 ml.) is added and the mixture stirred at 10°C. for one half-hour.

B. 3-Chloro-4-(4-Chlorophenoxy)-5-Methylphenylhydrazone of Ethyl Cyanoglyoxalate The diazonium solution from step A is added slowly to a mixture of ethyl cyanoacetate (5.6 g., 49.6 mM) and sodium acetate (9.3 g., 114 mM) in ethanol (170 ml.) at 15°C. The reaction mixture is stirred for a half-hour and the resulting precipitate filtered off, washed with water to remove inorganic salts and then dried in a vacuum oven at 50°C. (The product is a mixture of the cis and trans isomers).

C. 3-Chloro-4-(4-Chlorophenoxy)-5-Methylphenylhydrazone Glyoxamide

The hydrazone of step B and potassium hydroxide (2.55 g. of 85% KOH, 38 mM) in aqueous ethanol (200 ml. of 1:1 solution) is refluxed for three hours under an atomsphere of nitrogen. The reaction mixture is then cooled; diluted with water (200 ml.) and the product recovered by filtration. It is washed with water and dried in a vacuum oven at 50°C.

D. 2-[3-Chloro-4-(4-Chlorophenoxy)-5-Methylphenyl]-1,2,4-Triazine-3,5(2H,4H)-Dione The product of step C is added in one portion to a mixture of dimethyl carbonate (200 ml.) and sodium hydride (1.49 g. of a 57% dispersion, 35.1 mM) contained in a three-neck flask equipped with a stirrer, reflux condenser and nitrogen inlet. Methanol (one drop) is added to the mixture which is heated to reflux for 3 hours. It is then cooled to room temperature and treated with hydrochloric acid (200 ml. of 1N). The organic phase is extracted with chloroform, the extract washed with water, and dried. The chloroform solution is passed through a column of basic alumina and the product eluted therefrom with 10% methanolic hydrogen chloride. Evaporation of the eluate affords the crude product. It is purified by recrystallization from acetic acid-hexane. The acetic acid salt thus produced is stirred in excess 5% sodium bicarbonate solution to give the title product which is recovered by filtration, washed with water and dried.

EXAMPLE II

The procedure of Example I is repeated but using the appropriately substituted aniline of the formula:

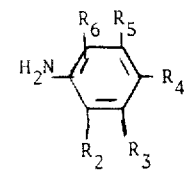

in place of 3-chloro-4-(4-chlorophenoxy)-5-methylaniline to produce compounds of the formula:

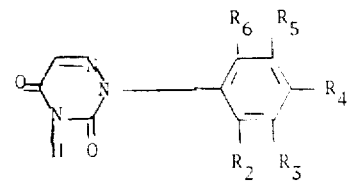

| $R_2$ | $R_3$ | $R_4$ | $R_5$ | $R_6$ |
|---|---|---|---|---|
| H | H | H | H | H |
| H | H | CH₃ | H | H |
| H | CH₃ | CN | H | H |
| H | CH₃ | COCH₃ | H | H |
| H | H | Cl | H | H |
| H | Br | H | H | H |
| H | I | SCN | H | H |
| F | H | F | H | H |
| F | H | H | H | F |
| H | O—(n—C₃C₇) | H | H | H |
| CH₃ | H | H | NO₂ | H |
| CN | H | CF₃ | H | H |
| Cl | H | NO₂ | H | H |
| H | Cl | OCH₃ | H | H |
| H | CF₃ | NO₂ | H | H |
| C₂H₅ | H | Br | NO₂ | H |
| H | Br | n—C₃H₇ | H | H |
| H | Cl | —S—(4—ClC₆H₄) | Cl | H |
| H | H | —O—(2—NO₂C₆H₄) | H | H |
| H | H | —OC₆H₅ | H | H |
| H | CH₃ | —SO₂—(4—NO₂C₆H₄) | H | H |
| H | SCH₃ | H | SCH₃ | H |
| H | CH₃ | —O—(4—CH₃S—C₆H₄) | CH₃ | H |
| H | Cl | —O—(4—CH₃S—C₆H₄) | H | H |
| H | CH₃ | —O—(3—CH₃—4—CH₃S—C₆H₃) | H | H |
| H | Cl | —O—(3—CH₃—4—CH₃S—C₆H₃) | CH₃ | H |
| H | Cl | —O—(4—CH₃CO—C₆H₄) | CH₃ | H |
| H | CH₃ | —O—(4—CH₃SO₂—C₆H₄) | H | H |
| H | Cl | —O—(3—CH₃—4—CH₃SO₂—C₆H₃) | CH₃ | H |
| H | Ch₃ | OCH₂—(4—ClC₆H₄) | CH₃ | H |
| H | Cl | —OCH₂—(2,4—Cl₂—C₆H₃) | H | H |
| H | CH₃ | —OCH₂—(4—CH₃SO₂—C₆H₄) | CH₃ | H |
| H | CH₃ | —O—(2—Cl—4—H₂NSO—C₆H₃) | Cl | H |
| H | CH₃ | —O—(2—Cl—4—H₂NSO₂—C₆H₃) | CH₃ | H |
| H | CH₃ | —S—(3—CNC₆H₄) | CH₃ | H |

— Continued

| $R_2$ | $R_3$ | $R_4$ | $R_5$ | $R_6$ |
|---|---|---|---|---|
| H | H | —S—(3—ClC₆H₄) | H | H |
| C₂H₅ | H | S—(4—FC₆H₄) | NO₂ | H |
| H | H | —S—(3—CH₃—C₆H₄) | H | H |
| F | OCH₃ | —CO—C₆H₅ | OCH₃ | H |
| H | SCH₃ | —COC₆H₅ | SCN | H |
| H | OCH₃ | —CO—(O—tolyl) | OCH₃ | H |
| H | CF₃ | —CO—(4—ClC₆H₄) | CF₃ | H |
| H | SCH₃ | —CO—(2—BrC₆H₄) | SCH₃ | H |
| H | CH₃ | —S—(4—CH₃C₆H₄) | CH₃ | H |
| H | Cl | —CO—(2—CH₃O—4—Cl—C₆H₃) | CH₃ | H |
| H | Cl | —SO₂—n—C₄H₉ | Cl | H |
| H | Cl | —SO₂—C₉H₁₉ | Cl | H |
| F | H | —SO₂—CH₃ | H | H |
| H | Cl | —SO₂—pyrrolino | Cl | H |
| H | C₂H₅ | —SO₂—morpholino | C₂H₅ | H |
| H | H | —CHOH—(4—ClC₆H₄) | H | H |
| H | CH₃ | —CHOH—(2—CH₃—4—BrC₆H₃) | H | H |
| H | Cl | thiomorpholino | Cl | H |
| H | Cl | piperazino | Cl | H |
| H | Cl | pyrrolo | Cl | H |
| H | Cl | piperidino | Cl | H |
| H | Cl | N—methylpiperazino | Cl | H |
| H | Cl | —N(CH₃)₂ | Cl | H |
| H | Cl | —N(n—C₄H₉)₂ | Cl | H |
| H | Cl | —N(CH₃)(n—C₄H₉) | Cl | H |
| CH₃ | H | —SO₂N(C₆H₅)(CH₃) | CH₃ | H |
| H | Cl | —SO₂N(CH₂C₆H₅)CH₃ | H | Cl |
| H | CH₃ | —SO₂N(CH₂—CH=CH₂)(CH₃) | CH₃ | H |
| H | NO₂ | —SO₂N(CH₂—CH=CH₂)₂ | CH₃ | H |
| H | H | —SO₂N(CH₂—CH=CH₂)₂ | CH₃ | H |
| H | Cl | —SO₂N(CH₃)(4—ClC₆H₄) | CH₃ | H |
| H | CH₃ | —OCH₂—(4—BrC₆H₄) | CH₃ | H |
| H | Cl | —OCH₂—(2,4—Cl₂—C₆H₃) | H | H |
| H | CH₃ | —OCH₂—(4—CH₃SO₂—C₆H₄) | CH₃ | H |
| H | Cl | —O—(6—Br—2—naphthyl) | H | H |
| H | Cl | —S—(6—Cl—2—naphthyl) | CH₃ | H |

| $R_2$ | $R_3$ | $R_4$ | $R_5$ | $R_6$ |
|---|---|---|---|---|
| H | Cl | -OCH₂-(2-naphthyl) | Cl | H |
| H | CH₃ | -O-(6-CH₃S-2-naphthyl) | H | H |
| H | H | -SCH₂-(4-ClC₆H₄) | OCH₃ | H |
| H | CH₃ | -SCH₂-(2,4,6-Cl₃C₆H₂) | CH₃ | H |
| H | Cl | -SCH₂-(4-NO₂C₆H₄) | H | H |
| H | CH₃ | -SCH₂-(2,4-CF₃C₆H₄) | Cl | H |
| H | C₂H₅ | -SCH₂-(4-CH₃SO₂C₆H₄) | H | H |
| H | CH₃ | -SO₂CH₂-(4-CH₃SO₂C₆H₄) | H | H |
| H | CH₃ | -SO₂CH₂-(2,4,6-Cl₃C₆H₂) | H | H |
| H | Cl | -SO₂CH₂-(4-ClC₆H₄) | CH₃ | H |
| H | Cl | -SO₂CH₂-(2-CH₃OC₆H₄) | Cl | H |
| H | Cl | -CH₂-C₆H₅ | CH₃ | H |
| H | CH₃ | -CH₂-Morpholino | CH₃ | H |
| H | Cl | -CH₂-thiazolidino | H | H |
| H | Cl | -CH₂-thiomorpholino | CH₃ | H |
| H | Cl | -OCH₂CO-(2-ClC₆H₄) | CH₃ | H |
| H | Cl | -OCH₂CO-(2,4-Cl₂C₆H₃) | H | H |
| H | CH₃ | -OCH₂CO-(3-CH₃C₆H₄) | Cl | H |
| H | Cl | -OCH₂CO-(4-CH₃COC₆H₄)H | CH₃ | H |

—Continued

| $R_2$ | $R_3$ | $R_4$ | $R_5$ | $R_6$ |
|---|---|---|---|---|
| H | CH$_3$ | -NCH$_2$-C$_6$H$_5$ | CH$_3$ | H |
| H | Cl | -NCH$_2$-(4-ClC$_6$H$_4$) | Cl | H |
| H | CF$_3$ | -NCH$_2$-2,4-Cl$_2$C$_6$H$_4$ | H | H |
| H | CH$_3$ | -NCH$_2$-(3-CH$_3$C$_6$H$_4$) | Cl | H |

EXAMPLE III

Repetition of the procedure of Example 1 but using the appropriate arylamine in place of the substituted aniline used therein affords the following compounds:

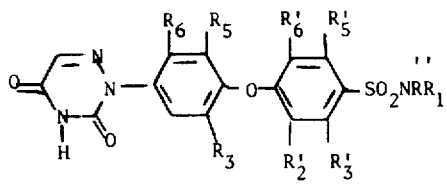

c. reacting the thus produced glyoxamide arylhydrazone with a di(lower alkyl) carbonate in the presence of a basic condensing agent to product a 2-aryl-1,2,4-triazine-3,5(2H,4H)-dione, said arylamine being of the formula

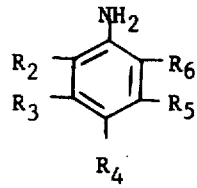

| $R_3$ | $R_5$ | $R_6$ | $R_2'$ | $R_3'$ | $R_5'$ | $R_6'$ | NR'R$_1$' |
|---|---|---|---|---|---|---|---|
| CH$_3$ | Cl | H | Cl | H | H | H | N—(CH$_3$)$_2$ |
| CH$_3$ | Cl | H | Cl | H | H | H | NH$_2$ |
| CH$_3$ | Cl | H | Cl | H | H | H | NH—CH$_2$CH=CH$_2$ |
| CH$_3$ | Cl | H | Cl | H | H | H | NH—(CH$_2$)$_2$SCH$_3$ |
| CH$_3$ | Cl | H | Cl | H | H | H | NH—(CH$_2$)$_2$OCOCH$_3$ |
| CH$_3$ | Cl | H | Cl | H | H | H | NH—(CH$_2$)$_2$O(CH$_2$)$_2$CH$_3$ |
| CH$_3$ | Cl | H | Cl | H | H | H | NH—(CH$_2$)$_2$SO$_2$CH$_3$ |
| CH$_3$ | Cl | H | Cl | H | H | H | N—(CH$_2$CH$_2$OH)$_2$ |
| CH$_3$ | CH$_3$ | H | CH$_3$ | CH$_3$ | CH$_3$ | H | N(C$_2$H$_5$)$_2$ |
| CH$_3$ | CH$_3$ | H | CH$_3$ | CH$_3$ | CH$_3$ | H | NH—(CH$_2$)$_2$OCH$_3$ |
| CH$_3$ | CH$_3$ | H | CH$_3$ | CH$_3$ | CH$_3$ | H | NH—CH$_2$CH$_2$SCH$_3$ |
| CH$_3$ | CH$_3$ | H | CH$_3$ | CH$_3$ | CH$_3$ | H | N(CH$_3$)—CH$_2$CH=CH$_2$ |
| CH$_3$ | CH$_3$ | H | CH$_3$ | CH$_3$ | CH$_3$ | H | NH—CH$_2$CH$_2$OH |
| CH$_3$ | CH$_3$ | H | CH$_3$ | CH$_3$ | CH$_3$ | H | NH—(CH$_2$)$_2$SO$_2$CH$_3$ |
| CH$_3$ | Cl | H | CH$_3$ | CH$_3$ | CH$_3$ | H | NH$_2$ |
| Cl | CH$_3$ | H | Cl | H | H | H | N(CH$_3$) (C$_2$H$_5$) |
| CH$_3$ | Cl | H | Cl | H | H | H | NH—CH$_2$CH=CH$_2$ |
| CH$_3$ | CH$_3$ | H | Cl | CH$_3$ | CH$_3$ | CH$_3$ | NH—(CH$_2$)$_2$SCH$_3$ |
| CH$_3$ | Cl | H | Cl | H | H | H | NH—(CH$_2$)$_2$OCOCH$_3$ |
| CH$_3$ | Cl | H | Cl | H | H | H | NH—(CH$_2$)$_2$O(CH$_2$)$_2$CH$_3$ |
| CH$_3$ | Cl | H | Cl | H | H | H | NH—(CH$_2$)$_2$SO$_2$CH$_3$ |
| CH$_3$ | Cl | H | Cl | H | H | H | N—(CH$_2$CH$_2$OH)$_2$ |
| CH$_3$ | CH$_3$ | H | CH$_3$ | CH$_3$ | CH$_3$ | H | N(C$_2$H$_5$)$_2$ |
| Cl | CH$_3$ | H | CH$_3$ | CH$_3$ | CH$_3$ | H | NH—(CH$_2$)$_2$OCH$_3$ |
| CH$_3$ | CH$_3$ | H | CH$_3$ | CH$_3$ | CH$_3$ | H | NH—CH$_2$CH$_2$SCH$_3$CH$_3$ |
| CH$_3$ | CH$_3$ | H | CH$_3$ | CH$_3$ | CH$_3$ | H | N—(CH$_2$CH=CH$_2$) |
| CH$_3$ | CH$_3$ | H | CH$_3$ | CH$_3$ | CH$_3$ | H | NH—CH$_2$CH$_2$OH |
| CH$_3$ | CH$_3$ | H | CH$_3$ | CH$_3$ | CH$_3$ | H | NH—(CH$_2$)$_2$SO$_2$CH$_3$H |
| CH$_3$ | Cl | H | CH$_3$ | CH$_3$ | CH$_3$ | H | N(CH$_3$)$_2$ |
| CH$_3$ | Cl | H | CH$_3$ | CH$_3$ | CH$_3$ | H | NH—(CH$_2$)$_3$O(CH$_2$)$_2$OCH$_3$ |
| CH$_3$ | Cl | H | CH$_3$ | CH$_3$ | CH$_3$ | H | NH—(CH$_2$)$_2$SO$_2$CH$_3$ |
| CH$_3$ | Cl | H | CH$_3$ | H | H | H | Morpholino |
| CH$_3$ | Cl | H | Cl | H | H | H | NH—(CH$_2$)$_3$CH$_3$ |
| CH$_3$ | Cl | H | CH$_3$ | CH$_3$ | CH$_3$ | H | NH—(CH$_2$)$_2$OCH$_3$ |
| CH$_3$ | Cl | H | CH$_3$ | CH$_3$ | CH$_3$ | H | NH—CH$_2$CH$_2$OH |
| CH$_3$ | Cl | H | CH$_3$ | CH$_3$ | CH$_3$ | H | NH—(CH$_2$)$_2$OCOCH$_3$ |
| CH$_3$ | Cl | H | CH$_3$ | CH$_3$ | CH$_3$ | H | Pyrrolidino |
| CH$_3$ | Cl | H | Cl | H | H | H | NH—C$_3$H$_5$ |
| Cl | CH$_3$ | H | H | CH$_3$ | CH$_3$ | CH$_3$ | N(CH$_3$) (C$_2$H$_5$) |
| CH$_3$ | CH$_3$ | H | H | CH$_3$ | CH$_3$ | H | NH—C$_3$H$_5$ |
| Cl | CH$_3$ | H | Cl | H | H | H | N(CH$_3$) (C$_2$H$_5$) |

What is claimed is:
1. A process for preparing 2-aryl-1,2,4-triazine-3,5(2H,4H)-diones which comprises:

a. coupling a diazotized arylamine with a lower alkyl cyanoacetate to produce a lower alkyl cyanoglyoxalate arylhydrazone;

b. hydrolyzing and decarboxylating the lower alkyl cyanoglyoxalate arylhydrazone thus produced under alkaline conditions to produce a glyoxamide arylhydrazone and wherein each of $R_2$ and $R_6$ is hydrogen, fluoro, chloro, cyano or methyl, with the proviso that at least one of $R_2$ and $R_6$ is hydrogen or fluoro;

each of $R_3$ and $R_5$ is selected from a first sub-group consisting of hydrogen, cyano, trifluoromethyl, halogen and lower alkyl; a second sub-group consisting of lower alkoxy and lower alkylthio; a third sub-group consisting of nitro and thiocyanato;

$R_4$ is $R_3$ or a fourth sub-group consisting of NR$_7$R$_8$, alkylsulfonyl having 1 to 9 carbon atoms, SO$_2$NRR$_1$, lower alkanoyl, —CH$_2$—NR$_{11}$R$_{12}$,

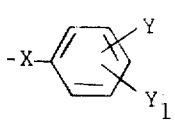 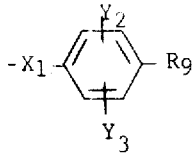

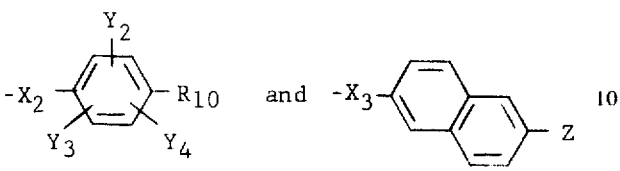

with the provisos that when R₄ is SO₂NRR₁ or alkanoyl, at least one of $R_3$ and $R_5$ is other than hydrogen; and when at least one of $R_3$ and $R_5$ is selected from the second sub-group, $R_4$ is selected from the first, third or fourth sub-groups; and when $R_3$ or $R_5$ is methyl or chloro and X is sulfur, —SO₂— or

then $R_4$ is other than

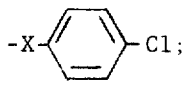

R is methyl, ethyl, allyl, propargyl, phenyl, benzyl or p-chlorophenyl;

$R_1$ is methyl, ethyl, allyl or propargyl;

R and $R_1$ when taken together with the nitrogen to which they are attached are morpholino, thiomorpholino, pyrrolo, pyrrolino, pyrrolidino, N-(lower alkyl)piperazino, hexamethyleneimino, 3,4-dichloropiperidino, thiazolidino, $\Delta^3$-tetrahydropyridino or piperazino;

Each of $R_7$ and $R_8$ is lower alkyl of from 1 to 4 carbon atoms; $R_7$ and $R_8$ when taken together with the nitrogen atom to which they are attached are morpholino, thiomorpholino, pyrrolo, pyrrolino, pyrrolidino, piperidino, N-(lower alkyl) piperazino, hexamethyleneimino, thiazolidino, $\Delta^3$-tetrahydropyridino or piperazino;

$R_9$ is hydrogen, halogen, lower alkylthio, lower alkylsulfinyl, lower alkylsulfonyl, lower alkoxy, trifluoromethyl or nitro;

$R_{10}$ is lower alkylthio, lower alkylsulfinyl, lower alkylsulfonyl, trifluoromethyl, lower alkanoyl or SO₂NR′R′₁;

R′ when taken alone is hydrogen, lower alkyl, allyl, propargyl, phenyl, benzyl, p-chlorophenyl, β-hydroxyethyl, β-acetoxyethyl, β-methoxyethyl, β-methylthioethyl, β-methylsulfonylethyl or cyclopropyl;

R′₁ when taken alone is hydrogen, lower alkyl, propargyl, β-hydroxyethyl, β-acetoxyethyl, β-methoxyethyl, β-methylthioethyl, β-methylsulfonylethyl, γ-(β-methoxyethoxy)-propyl, cyclopropyl or cyclopentyl;

R′ and R′₁ when taken together with the nitrogen to which they are attached complete a morpholino or pyrrolidino ring;

$R_{11}$ and $R_{12}$ taken together with the nitrogen to which they are attached complete a morpholino, thiomorpholino or thiazolidino ring;

X is selected from the group consisting of oxygen, sulfur,

=NH, —S → O, —SO₂— and —CHOH—;

$X_1$ is —OCH₂, —SCH₂—, —SO₂CH₂—, —CH₂—, —OCH₂—CO— or —NCH₂—;

$X_2$ is oxygen, sulfur, —SO—, —SO₂—,

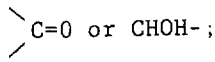

$X_3$ is oxygen, sulfur or —OCH₂—;

each of Y and $Y_1$ is selected from the group consisting of hydrogen, nitro, cyano, halogen, lower alkyl and lower alkoxy;

$Y_2$, $Y_3$ and $Y_4$ are each hydrogen, halogen, lower alkyl or trifluoromethyl and Z is hydrogen, lower alkylthio or halogen.

2. The process of claim 1 wherein the basic condensing agent is sodium hydride.

3. The process of claim 1 wherein each of $R_2$ and $R_6$ is hydrogen and each of $R_3$, and $R_4$ and $R_5$ is selected from the first subgroup.

4. The process of claim 3 wherein each of $R_2$ and $R_6$ is hydrogen; each of $R_3$ and $R_5$ is selected from the first subgroup; and $R_4$ is selected from the fourth subgroup.

5. The process of claim 4 wherein $R_4$ is

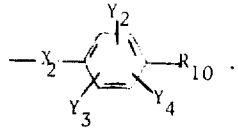

6. The process of claim 4 wherein $R_4$ is

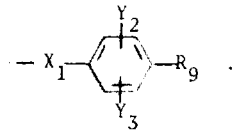

7. The process of claim 5 wherein $X_2$ is oxygen.

8. The process of claim 7 wherein $R_{10}$ is —SCH₃.

9. The process of claim 8 wherein $R_2$, $R_6$, $Y_2$ and $Y_3$ are each hydrogen, $R_3$ and $R_5$ are each methyl, and $Y_4$ is meta-methyl.

10. The process of claim 7 wherein $R_{10}$ is —SO₂NR′R′₁.

11. The process of claim 10 wherein R′, R′₁, $R_2$, and $R_6$ are each hydrogen; $R_5$, $Y_2$, $Y_3$, and $Y_4$ are each methyl, and $R_3$ is chloro.

12. The process of claim 10 wherein R′ is methyl, R′₁ is ethyl, $R_2$, $R_6$, $Y_3$, and $Y_4$ are each hydrogen, $R_3$ is chloro, $Y_2$ is ortho-chloro, and $R_5$ is methyl.

13. The process of claim 7 wherein $R_{10}$ is —COCH₃; $R_3$ is chloro; $R_5$ is methyl; $R_2$, $R_6$, $Y_2$, $Y_3$ and $Y_4$ are each hydrogen.

14. The process of claim 10 wherein R, $R_5$, $Y_2$, $Y_3$ and $Y_4$ are each methyl, R′₁ is ethyl, $R_3$ is chloro, and $R_2$ and $R_6$ are each hydrogen.

15. The process of claim 10 wherein R′ and R′₁ are each ethyl, $R_2$ and $R_6$ are each hydrogen, and $R_3$, $R_5$, $Y_2$, and $Y_3$, and $Y_4$ are each methyl.

16. The process of claim 10 wherein R′ is hydrogen, R′₁ is cyclopropyl, $R_2$, $R_6$, $Y_2$, and $Y_3$ are each hydrogen, $R_3$ is chloro, $Y_4$ is ortho-chloro, and $R_5$ is methyl.

17. The process of claim 10 where R′, $R_2$, $R_6$, and $Y_4$ are each hydrogen, R′₁ is cyclopropyl, and $R_3$, $R_5$, $Y_2$ and $Y_3$ are each meta-methyl.

18. The process of claim 10 wherein R′ is β-methoxyethyl, R′₁, $R_2$, and $R_6$ are each hydrogen, $R_5$, $Y_2$, $Y_3$, and $Y_4$ are each methyl, and $R_3$ is chloro.

19. The process of claim 10 wherein R′ is β-methylthioethyl; R′₁, $R_2$, and $R_6$ are each hydrogen; and $R_3$, $R_5$, $Y_2$, $Y_3$, and $Y_4$ are each methyl.

20. The process of claim 10 wherein R′ is methyl; R′₁ is ethyl; $R_3$ is chloro; $R_5$ is methyl; $Y_2$ is ortho ethyl; and $R_2$, $R_6$, $Y_3$ and $Y_4$ is each hydrogen.

21. The process of claim 4 wherein $R_4$ is of the formula

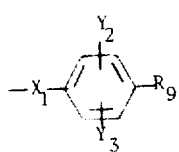
22. The process of claim 21 wherein $X_1$ is $-OCH_2-$.
23. The process of claim 22 wherein $R_3$ is hydrogen or lower alkyl; $R_5$ is lower alkyl or halogen; $Y_2$ and $Y_3$ are each hydrogen, halogen or lower alkyl; and $R_9$ is halogen or $-SO_2CH_3$.
* * * * *